(12) United States Patent
Lan (10) Patent No.: US 10,979,689 B2
(45) Date of Patent: Apr. 13, 2021

(54) ADAPTIVE STEREO SCALING FORMAT SWITCH FOR 3D VIDEO ENCODING

(71) Applicant: ARRIS Enterprises, Inc., Suwanee, GA (US)

(72) Inventor: John Lan, Suwanee, GA (US)

(73) Assignee: ARRIS Enterprises LLC, Suwanee, GA (US)

(*) Notice: Subject to any disclaimer, the term of this patent is extended or adjusted under 35 U.S.C. 154(b) by 229 days.

(21) Appl. No.: 14/332,721

(22) Filed: Jul. 16, 2014

(65) Prior Publication Data

US 2016/0021354 A1    Jan. 21, 2016

(51) Int. Cl.
| | |
|---|---|
| *H04N 19/597* | (2014.01) |
| *H04N 13/178* | (2018.01) |
| *H04N 13/139* | (2018.01) |
| *H04N 21/81* | (2011.01) |
| *H04N 21/4402* | (2011.01) |

(Continued)

(52) U.S. Cl.
CPC ......... *H04N 13/139* (2018.05); *H04N 13/161* (2018.05); *H04N 13/194* (2018.05); *H04N 21/44008* (2013.01); *H04N 21/440263* (2013.01); *H04N 21/816* (2013.01); *H04N 2013/0085* (2013.01)

(58) Field of Classification Search
CPC ..... H04N 2013/0081; H04N 2213/007; H04N 13/0048; H04N 13/0029; H04N 2213/008; H04N 13/0059; H04N 21/44008; H04N 21/440263; H04N 21/816; H04N 2013/0085; H04N 13/0055; H04N 19/00769; H04N 13/0239; H04N 19/597; H04N 13/161; H04N 13/178; G06T 15/20

USPC .............................................. 348/43
See application file for complete search history.

(56) References Cited

U.S. PATENT DOCUMENTS

| | | | |
|---|---|---|---|
| 7,064,790 B1* | 6/2006 | Varma | H04N 7/012 348/441 |
| 8,537,890 B2* | 9/2013 | Sadowksi | H04N 19/176 375/240.01 |

(Continued)

OTHER PUBLICATIONS

Vetro et al: "Overview of the Stereo and Multiview Video Coding Extensions of the H.264/MPEG-4 AVC Standard", Proceedings of the IEEE, vol. 99, No. 4, Apr. 1, 2011 (Apr. 1, 2011), pp. 626-642, XP055132298, ISSN: 0018-9219, DOI: 10.1109/JPROG.2010.2098830.*

(Continued)

*Primary Examiner* — Patrick E Demosky
(74) *Attorney, Agent, or Firm* — Chernoff, Vilhauer, McClung & Stenzel, LLP (57) ABSTRACT

A method and apparatus for encoding three-dimensional ("3D") video includes receiving a left-eye interlaced frame and a corresponding right-eye interlaced frame of a 3D video. An amount of interlacing exhibited by at least one of the left-eye interlaced frame and the corresponding right-eye interlaced frame is determined. A frame packing format to be used for packing the left-eye interlaced frame and the corresponding right-eye interlaced frame into a 3D frame is selected based on the amount of interlacing that is determined. The left-eye interlaced frame and the corresponding right-eye interlaced frame are formatted into a 3D frame using the selected frame packing format. Illustrative frame packing formats that may be employed include a side-by-side format and a top-and-bottom format.

11 Claims, 6 Drawing Sheets

One Frame (51) Int. Cl.
*H04N 21/44* (2011.01)
*H04N 13/161* (2018.01)
*H04N 13/194* (2018.01)
*H04N 13/00* (2018.01)

(56) References Cited

U.S. PATENT DOCUMENTS

| | | | | |
|---|---|---|---|---|
| 2004/0125231 A1* | 7/2004 | Song | ............ | H04N 7/012 348/452 |
| 2010/0321390 A1* | 12/2010 | Kim | ............ | H04N 13/139 345/427 |
| 2011/0032333 A1* | 2/2011 | Neuman | ............ | H04N 13/139 348/43 |
| 2011/0134210 A1* | 6/2011 | Tsukagoshi | ...... | H04N 21/23605 348/42 |
| 2012/0020413 A1* | 1/2012 | Chen | ............ | H04N 19/597 375/240.26 |
| 2012/0062710 A1* | 3/2012 | Lee | ............ | H04N 13/0007 348/51 |
| 2012/0262546 A1* | 10/2012 | Tsukagoshi | ........ | H04N 13/161 348/43 |
| 2013/0070051 A1* | 3/2013 | Ho | ............ | H04N 13/0048 348/43 |
| 2013/0076873 A1* | 3/2013 | Oshikiri | ............ | H04N 13/00 348/51 |
| 2015/0054914 A1* | 2/2015 | Wang | ............ | H04N 13/106 348/43 |
| 2015/0237373 A1* | 8/2015 | Tourapis | ............ | H04N 19/597 375/240.01 |

OTHER PUBLICATIONS

PCT Search Report & Written Opinion, Re: Application No. PCT/US2015/037748; dated Sep. 16, 2015.
A. Vetro, et al., "Overview of the Stereo and Multiview Video Coding Extensions of the H.264/MPEG-4 AVC Standard", Proceedings of the IEEE, vol. 99, No. 4, Apr. 1, 2011, pp. 626-642.
Dolby Laboratories, et al., "Dolby Open Specification for Frame-Compatible 3D Systems", retrieved from the Internet at URL<http://www.dolby.com/uploadedFiles/Assets/US/Doc/Professional/3DFrameCompatibleOpenStandard.pdf> on Dec. 19, 2012, 11 pages.
DVB Organization, "AVC 466 Open Cable OC-SP-CEP3.0-I01-100827.pdf", DVB, Digital Video Broadcasting, Sep. 16, 2010.
ETSI, "Digital Video Broadcasting (DVB); Frame Compatible Plano-Stereoscopic 3DTV (DVB-3DTV) DVB Document A154", retrieved from the Internet at URL <http://www.dvb.org/technology/standards/a154_DVB-3DTV_Spec.pdf> on Feb. 27, 2012.

* cited by examiner

Original Left Channel Frame

FIG. 3A

Original Right Channel Frame

One Frame

ADAPTIVE STEREO SCALING FORMAT SWITCH FOR 3D VIDEO ENCODING

BACKGROUND

A set-top box (STB) is a computerized device that processes digital information. A STB is commonly used to receive encoded/compressed digital signals from a signal source (e.g., a cable provider's headend) and decodes/decompresses those signals, converting them into signals that a television (TV) connected to the STB can understand and display.

Three dimensional (3D) TVs are becoming popular, and content providers are starting to provide a wide range of 3D content to the customer premises. 3D viewing refers to a technique for creating the illusion of depth in an image by presenting two offset images separately to the left and right eye of the viewer. Typically, a left-eye view and a right-eye view of the content are provided in the signal sent to the STB. The STB decodes the signal and sends the decoded 3D content to the 3D TV. The 3D TV then displays the 3D content including the left eye view and the right eye view. Glasses worn by the viewer may be used to create the 3D effect, for example, by filtering the displayed views for each eye.

Different content providers may deliver 3D content to the customer premises in different 3D formats. For example, the left-eye view and the right-eye view may be arranged in a top-bottom panel format or a left-right panel format. Currently, most 3D video content uses the left-right panel format to preserve vertical resolution.

SUMMARY

In accordance with one aspect of the invention, a 3D video program may have some frames encoded using a side-by-side frame packing format and other frames encoded using a top-to-bottom frame packing format. In particular, those portions of the 3D video program which are highly interlaced may be encoded using horizontal scaling so that vertical resolution is preserved. In addition, those portions of the 3D video program which are less interlaced may be encoded using vertical scaling, which preserves horizontal resolution. In this way visual resolution loss in 3D video programs is reduced.

In accordance with another aspect of the invention a method and apparatus is provided for encoding three-dimensional ("3D") video. In accordance with the method, a left-eye interlaced frame and a corresponding right-eye interlaced frame of a 3D video are received. An amount of interlacing exhibited by at least one of the left-eye interlaced frame and the corresponding right-eye interlaced frame is determined. A frame packing format to be used for packing the left-eye interlaced frame and the corresponding right-eye interlaced frame into a 3D frame is selected based on the amount of interlacing that is determined. The left-eye interlaced frame and the corresponding right-eye interlaced frame are formatted into a 3D frame using the selected frame packing format.

DETAILED DESCRIPTION

For simplicity and illustrative purposes, the present disclosure is described by referring mainly to examples thereof. In the following description, numerous specific details are set forth in order to provide a thorough understanding of the present disclosure. It is readily apparent however, that the present disclosure may be practiced without limitation to these specific details. In other instances, some methods and structures have not been described in detail so as not to unnecessarily obscure the present disclosure. Furthermore, different examples are described below. The examples may be used or performed together in different combinations.

As used herein, the term "3D video content" (or simply "3D content") may refer generally to any video content intended to be presented in 3D. Such video content may include, but is not limited to, television programs, on-demand media programs, pay-per-view media programs, broadcast media programs (e.g., broadcast television programs), multicast media programs, narrowcast media programs, IPTV content, advertisements (e.g., commercials), videos, movies, or any segment, component, or combination of these or other forms of media content that may be viewed by a user.

Figure 1:
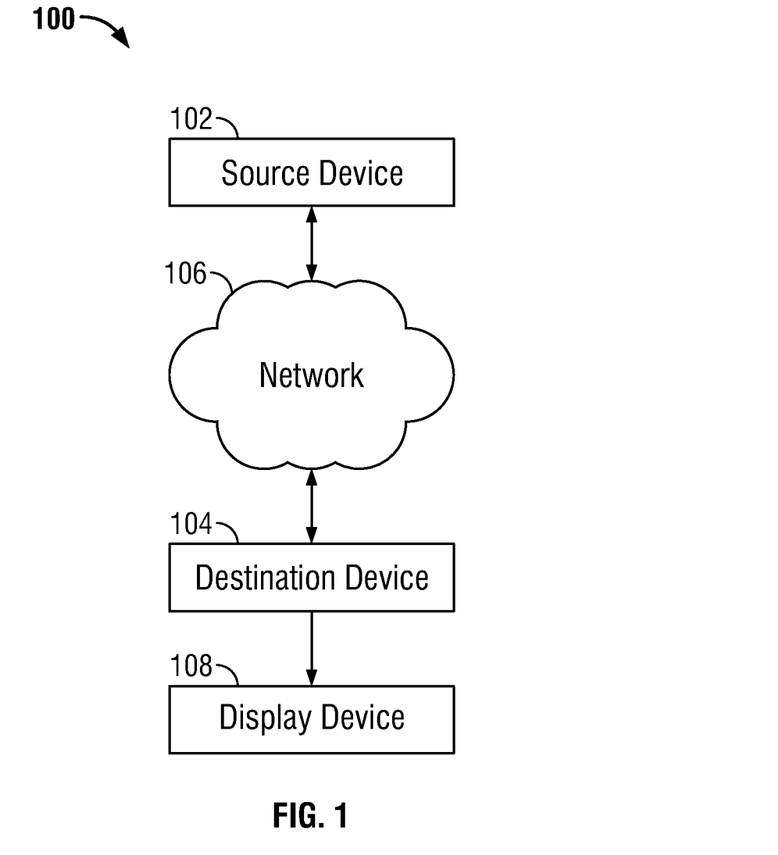
FIG. 1 illustrates one example of a 3D video content delivery system.

FIG. 1 illustrates one example of a 3D video content delivery system 100 (or simply "system 100"). System 100 may include a media content source device 102 (or simply "source device 102") and a media content destination device 104 (or simply "destination device 104") in communication with one another via a network 106. As shown in FIG. 1, destination device 104 may be separate from and communicatively coupled to a display device 108. However, in some embodiments the display device 108 may be directly incorporated in the destination device. Exemplary destination devices 104 include, but are not limited to, set-top boxes, media centers, PCs, laptops, tablets, smartphones and various other computing devices that may or may not directly incorporate a display device.

Network 106 may include one or more networks or types of networks (and communication links thereto) capable of carrying communications, media content, and/or data signals between source device 102 and destination device 104. For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between source device 102 and destination device 104. Communications between source device 102 and destination device 104 may be transported using any one of above-listed networks, or any combination or sub-combination of the above-listed networks.

Figure 2:
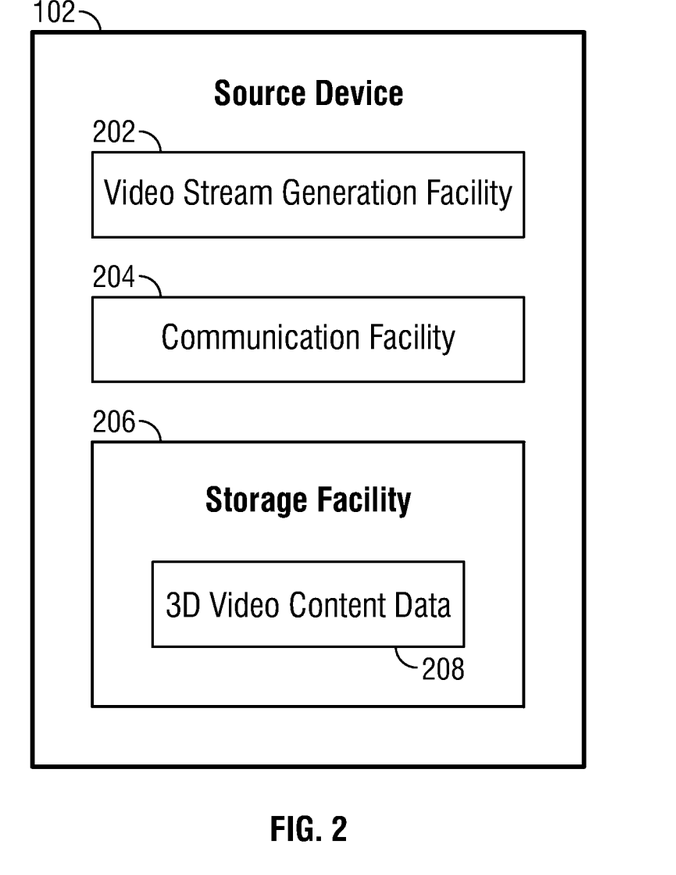
FIG. 2 illustrates one example of the source device shown in FIG. 1.

FIG. 2 illustrates one example of the components of source device 102. As shown in FIG. 2, source device 102 may include a 3D video content stream generation facility 202, a communication facility 204, and a storage facility 206, which may be in communication with one another using any suitable communication technology. It will be recognized that although facilities 202-206 are shown to be separate facilities in FIG. 2, any of those facilities may be combined into a single facility as may serve a particular application.

Video content stream generation facility 202 may be configured to generate a 3D video content stream comprising data representative of 3D video content. The 3D video content stream may be generated in accordance with any suitable process. For example, an exemplary 3D video content stream that may be generated by video content stream generation facility 202 includes a plurality of video frames each comprising data representative of a left image intended for a left eye of a viewer and data representative of a right image intended for a right eye of the viewer.

Communication facility 204 may be configured to facilitate communication between source device 102 and destination device 104. In particular, communication facility 204 may be configured to transmit and/or receive communication signals, media content instances, metadata and/or any other data to/from destination device 104. For example, communication facility 204 may transmit (e.g., broadcast, multicast, and/or narrowcast) one or more video content streams (e.g., 3D video content streams) generated by video content stream generation facility 202 to destination device 104. Additionally or alternatively, video content streams may be provided to destination device 104 as one or more data files or in any other suitable manner as may serve a particular implementation. Communication facility 204 may be configured to interface with any suitable communication media, protocols, and formats.

Storage facility 206 may be configured to maintain 3D video content data 208 representative of 3D video content. Storage facility 206 may maintain additional or alternative data as may serve a particular implementation.

The 3D video content delivery system 100 may operate in accordance with any 3D display technology. For example, the system 100 may be a passive polarization 3D system or an active shutter 3D system. An active shutter 3D system operates by alternatively presenting to the left and right eyes of a viewer wearing 3D viewing glasses. The 3D viewing glasses may be configured to allow only left images to be presented to the left eye and only right images to be presented to the right eye. The images may be presented in rapid enough succession so that the viewer does not notice that different images are being presented to both eyes. The net effect is that the left eye only sees the images presented to the left eye and the right eye only sees the images presented to the right eye, thereby creating a perception of 3D in the viewer's brain.

Additionally or alternatively, the 3D video content delivery system 100 may be a passive polarized system in which an image intended for the left eye and an image intended for the right eye are concurrently presented to a viewer. The left and right images are polarized in mutually orthogonal directions. The viewer views the image through polarized 3D viewing glasses so that only the left image is presented to the left eye and only the right image is presented to the right eye. The viewer's brain combines the two images into a single 3D image. Active shutter and passive polarized systems are merely illustrative of the various 3D content processing systems that may be used in accordance with the systems and methods described herein.

Figure 3A:
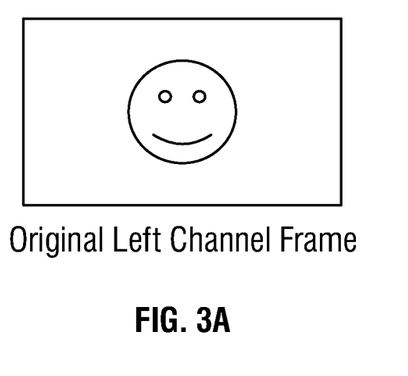
FIG. 3*a* shows one example of a left-view frame and FIG. 3*b* shows a corresponding right-view frame of a 3D video.
Figure 3B:
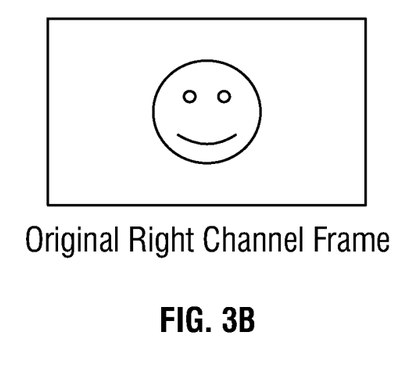

FIG. 3 shows one example of a left-view frame (FIG. 3a) and a corresponding right-view frame (FIG. 3b) of a 3D video. The left and right view frames may be combined into a single frame by the video content stream generation facility 202 to provide a 3D video signal that can be stored and delivered to the destination device 104. The manner in which the two frames are combined is sometimes referred to as the frame packing format.

Figure 4A:
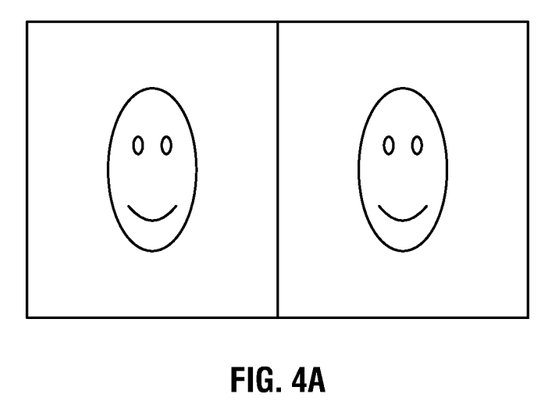
FIG. 4*a* shows one example of a side-by side frame packing format and FIG. 4*b* shows an example of a top-and-bottom frame packing format.
Figure 4B:
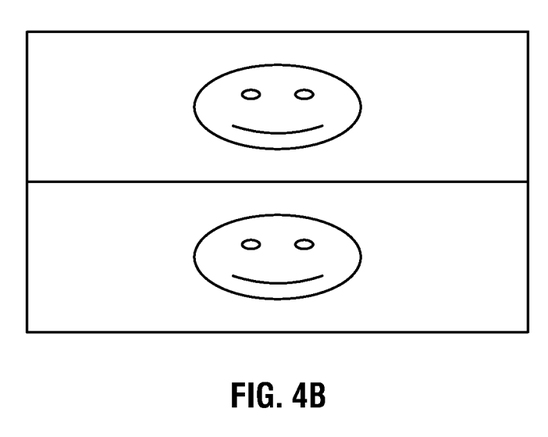

Two different frame packing formats are commonly employed. For example, one frame packing format encodes the two frames in a side-by-side arrangement (see FIG. 4a) and the other frame packing format encodes the two frames in a top-and-bottom arrangement. The side-by-side frame packing format employs horizontal scaling of the left and right frames and the top-and-bottom frame packing format employs vertical scaling of the left and right frames. As can be seen in FIG. 4a, horizontal scaling reduces the horizontal resolution of each frame while preserving the vertical resolution. Likewise, as can be seen in FIG. 4b, vertical scaling reduces the vertical resolution of each frame while preserving the horizontal resolution.

Similar to 2D video images, 3D video images often comprise interlaced frames. An interlaced frame is created by displaying two fields in turn, one field (referred to as the top field) containing the top line of the frame and every second subsequent line, and the other field (referred to as the bottom field) containing the second line from the top and every second subsequent line, thus including the bottom line of the frame. Interlaced frames rely on the fact that it takes time for the first field of displayed pixels to decay from the display device, during which time the second field is displayed, so as to create the illusion of a single frame containing all the lines of pixels.

Figure 5:
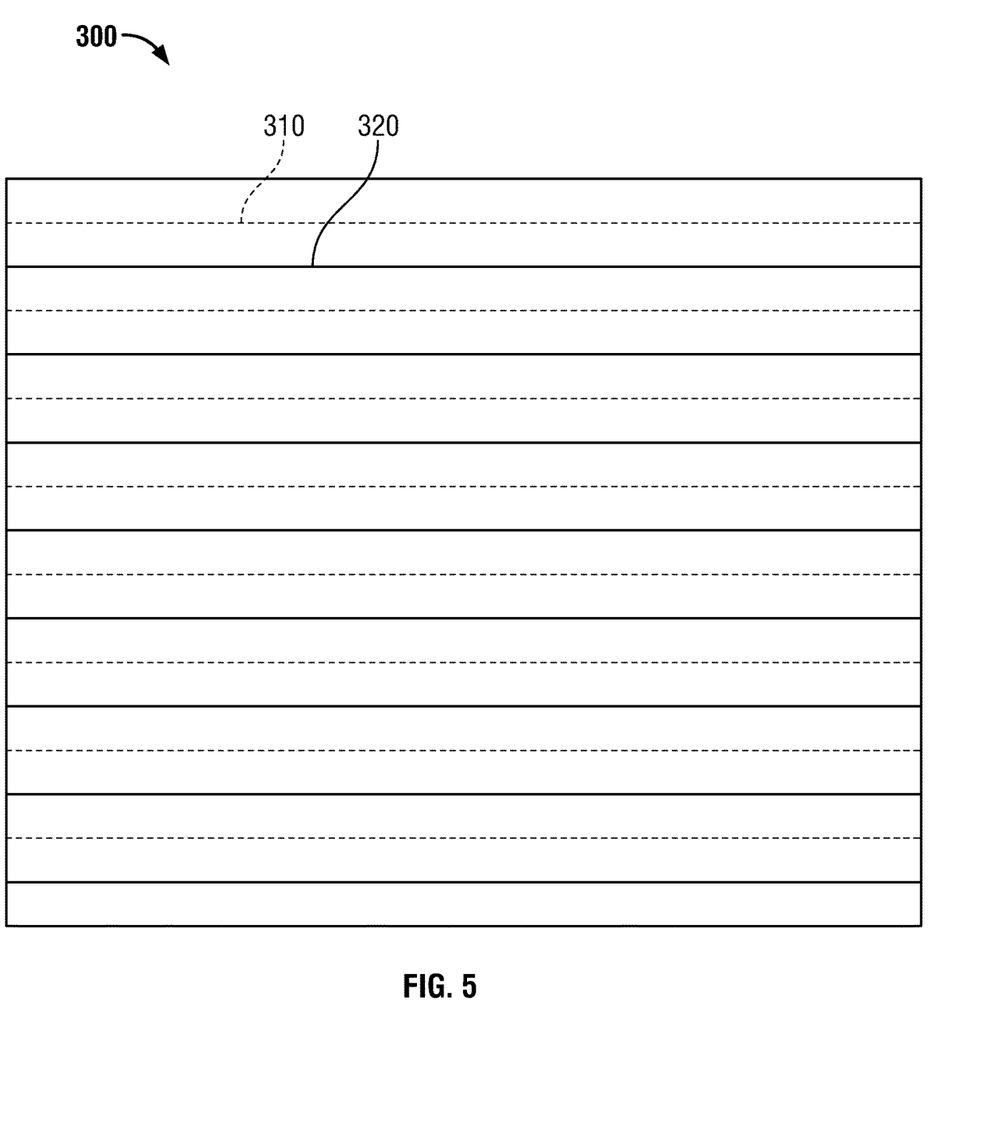
FIG. 5 schematically illustrates the interlaced horizontal lines of an interlaced image.

FIG. 5 schematically illustrates a video frame 300 that comprises horizontal lines 310 and 320 that make up an image. Typically, a frame conforming to the PAL standard comprises 625 such lines of pixels, whilst a frame conforming to the US NTSC standard comprises 525 lines. As previously mentioned, each video frame 300 comprises two separate fields. In FIG. 5 the top (or "even") field is illustrated by the broken lines and the bottom (or "odd") field is illustrated by the solid lines.

The nomenclature of "top" and "bottom" or "even" and "odd" fields is not limiting and generally indicates the existence of field lines of different parity. Video signals may include other fields and other field lines of different parities and in varying configurations. The use of "above," "below" and other relative indications of location are not intended to be limiting as it is understood that a video signal may have other spatial orientations.

The fields of an interlaced video frame are captured sequentially, which means that there is a small time delay between the first field to be captured and the second field to be captured. It is possible for the information contained in the scene to change in this time interval. As there is a small delay between displaying the first field and displaying the second field, the field intended to be displayed second may contain different information from that contained in the field intended to be displayed first. This disparity between fields may arise, for example if movement has occurred in the frame in the delay between displaying the first and second fields. Such differences between the field intended to be displayed first and the field intended to be displayed second are known as "inter-field motion". Inter-field motion may result in visually perceptible and undesirable artifacts that degrade the image.

Because interlacing artifacts become more visible with increasing inter-field motion of recorded objects, video having greater inter-field motion is sometimes referred to as being more highly interlaced than video having less inter-field motion.

Because each field of an interlaced frame includes only half the number of lines as a non-interlaced (i.e., progressive) frame, the interlacing process reduces the vertical resolution of an image. Thus, to ensure that an interlaced image has sufficient vertical resolution for adequate viewing, it is important for the image to be composed of as many lines as possible so that even with only half of the lines being presented at any given time, the image still appears satisfactory to a viewer. In other words, an interlaced frame is particularly sensitive to anything that further reduces the vertical resolution. Moreover, highly interlaced video, which has greater inter-field motion, is more sensitive to this problem than less interlaced video, which has less inter-field motion.

In an interlaced 3D image, both the left and right frames are interlaced. As noted above, when the left and right frames of a 3D image are combined in a top and bottom arrangement (see FIG. 4b) using vertical scaling, the vertical resolution is reduced while the horizontal resolution is preserved. Likewise, when the left and right frames of a 3D image are combined in a side-by-side arrangement (see FIG. 4a) using horizontal scaling, the vertical resolution is preserved while the horizontal resolution is reduced. Accordingly, it generally will be preferable to use a side-by-side frame packing format with video that is highly interlaced since this format will preserve the vertical resolution of the image. Since less interlaced video often benefits when horizontal resolution is preserved, it may be preferable to use a top-to-bottom frame packing format for such video.

In accordance with the subject matter of the present disclosure, a 3D video program may have some portions (e.g., frames, scenes) encoded using a side-by-side frame packing format and other portions encoded using a top-to-bottom frame packing format. In particular, those portions of the 3D video program which are highly interlaced may be encoded using horizontal scaling while those portions of the 3D video program which are less interlaced may be encoded using vertical scaling. In this way visual resolution loss in 3D video programs is reduced The amount or degree of interlacing that causes the encoding to switch between the two frame packet formats may be determined by trial and error, for example, and may be fixed in the encoder or in some cases it may be user adjustable.

Figure 6:
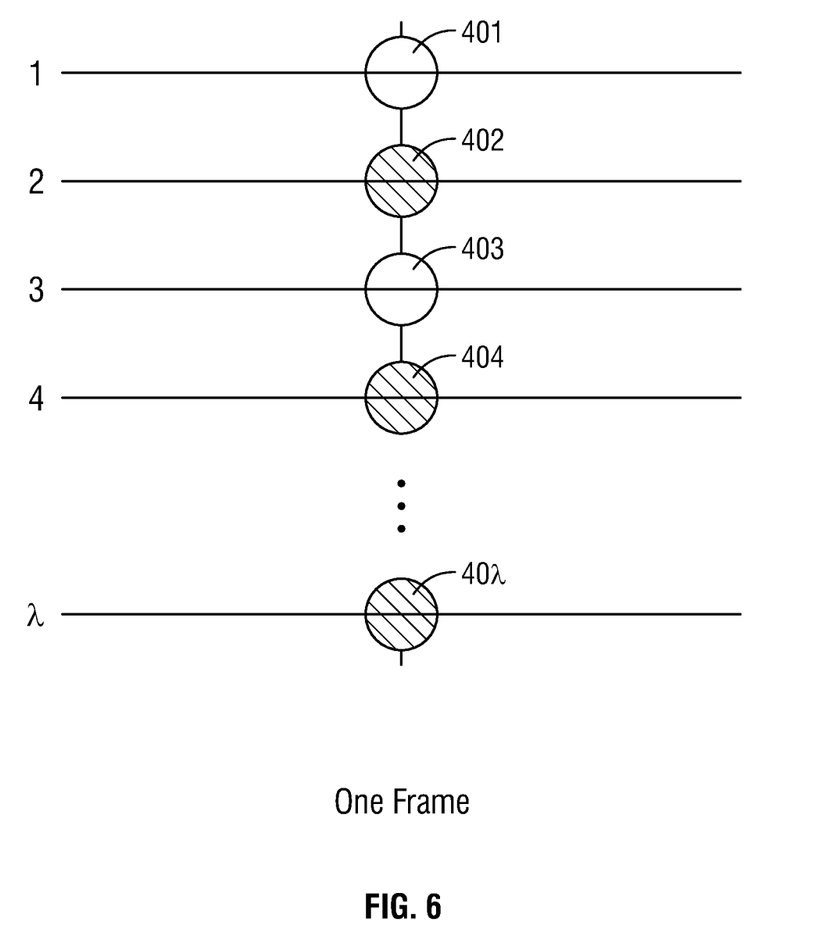
FIG. 6 shows a series of pixels, which are respectively located on different lines of an interlaced frame.

A measure of the amount of interlacing that is exhibited by a frame may be determined in any of a number of different ways using, e.g., video stream generation facility 202. For example, in one implementation the pixel values of pixels in adjacent lines of an interlaced frame may be compared to one another. The greater the difference in these pixel values, the greater the degree of interlacing exhibited by that frame. For example, FIG. 6 shows pixels $40_1$, $40_2$, $40_3$, $40_4$ ... $40_n$, which are respectively located on lines 1, 2, 3, 4 ... n of the interlaced frame. A difference in pixel values between pixels $40_2$ and $40_1$, pixels $40_4$ and $40_3$, and so on, may be determined. The greater these differences, the greater the degree of interleaving. In one implementation, if the average difference in these pixels values over a given interlaced frame exceeds a threshold, then the frame may be treated as more highly interlaced frame.

Of course, other measures of the amount or degree of interlacing may be employed. For instance, the motion of one or more objects across the fields of one or more interlaced frames may be determined in accordance with any suitable technique.

When the encoder selects a frame packing format to be used it may include data in the 3D video bitstream indicating its selection to the decoder. This data may be incorporated using any standard or proprietary protocol. For example, in some implementations the 3D video bitstream may include encoded frames complying with an H.264 standard. In accordance with the H.264 standard, supplemental enhancement information (SEI) may be used to transmit the frame packing type. An SEI message frame packing arrangement_type is defined to store a value indicative of the frame packing type. For instance, when the left-view frame and the right-view frame are horizontally combined in one decoded frame, the SEI message frame_packing_arrangement_type would store a value equal to 3 for indicating a side-by-side arrangement. When the left-view frame and the right-view frame are vertically combined in one decoded frame, the SEI message frame_packing_arrangement_type would store a value equal to 4 for indicating a top-and-bottom arrangement.

Alternatively, the 3D video bitstream may include encoded frames complying with an audio and video coding standard (AVS). In accordance with the AVS standard, a syntax element stereo_packing_mode may be used to indicate the frame packing type. For instance, when the left-view frame and the right-view frame are horizontally combined in one decoded frame, the syntax element stereo_packing_mode would store binary bits "01" for indicating a side-by-side arrangement. When the left-view frame and the right-view frame are vertically combined in one decoded frame, the syntax element stereo_packing_mode would store binary bits "10" for indicating a top-and-bottom arrangement.

Alternatively, the 3D video bitstream may include encoded frames complying with an advanced streaming format (ASF) based standard, such as a Windows Media Video (WMV) format. In accordance with the ASF based standard, an extended content description object may be used to indicate the frame packing type. For instance, when the left-view frame and the right-view frame are horizontally combined in one decoded frame, one attribute Stereoscopic would record a boolean value "True", and another attribute StereopicLayout may record a unicode string "SideBySideRF (side-by-side, right image first)" or "SideBySideLF (side-by-side, left image first)". When the left-view frame and the right-view frame are vertically combined in one decoded frame, one attribute Stereoscopic would record a boolean value "True", and another attribute StereopicLayout may record a unicode string "OverUnderRT (over/under, right image top)" or "OverUnderLT (over/under, left image top)".

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 7:
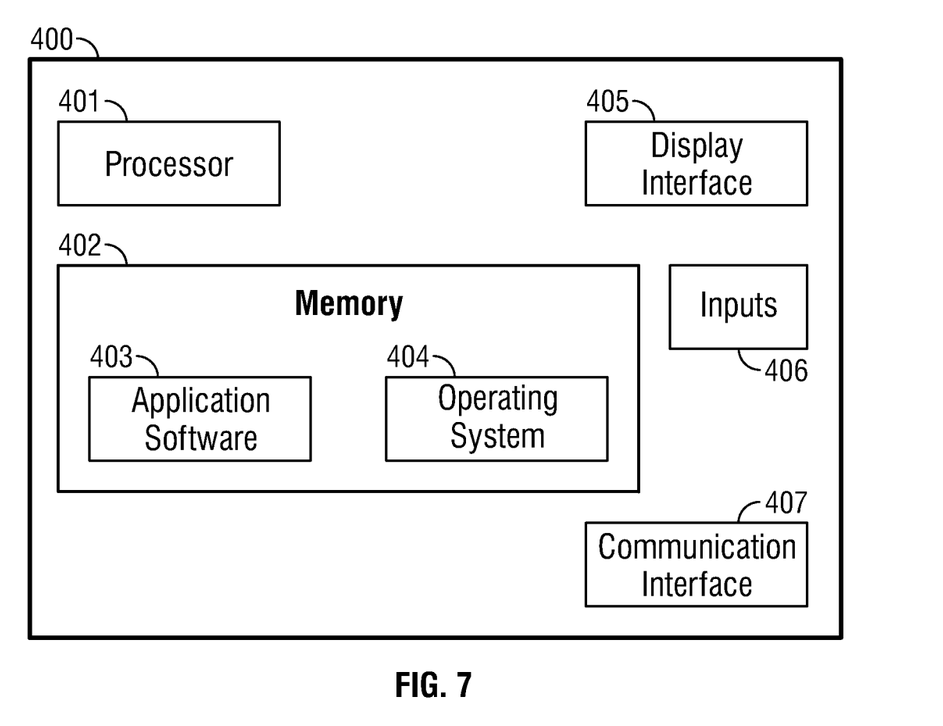
FIG. 7 shows an illustrative computing-based device in which embodiments of the source device and/or destination device shown in FIG. 1 may be implemented.

FIG. 7 illustrates various components of an illustrative computing-based device 400 which may be implemented as any form of a computing and/or electronic device, and in which embodiments of the source device and/or destination device may be implemented.

The computing-based device 400 comprises one or more inputs 406 which are of any suitable type for receiving media content, Internet Protocol (IP) input, activity tags, activity state information, resources or other input. The device also comprises communication interface 407 to enable the device to communicate with one or more other entity using any suitable communications medium.

Computing-based device 400 also comprises one or more processors 401 which may be microprocessors, controllers or any other suitable type of processors for processing computing executable instructions to control the operation of the device in order to provide a search augmentation system. Platform software comprising an operating system 404 or any other suitable platform software may be provided at the computing-based device to enable application software 403 to be executed on the device.

The computer executable instructions may be provided using any computer-readable media, such as memory 402. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 405 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method of encoding three-dimensional ("3D") video, comprising:
   receiving a left-eye interlaced frame and a corresponding right-eye interlaced frame of a 3D video;
   determining an amount of interlacing exhibited independently by each of at least one of the left-eye interlaced frame or the corresponding right-eye interlaced frame prior to a combination of said at least one left-eye interlaced frame and right-eye interlaced frame into a single 3D frame,
   wherein the amount of interlacing is determined by comparing pixel values of pixels in adjacent lines within a respective at least one of the left-eye interlaced frame or the right-eye interlaced frame,
   providing an indication when the average difference in the pixel values within the respective interlaced frame exceeds a threshold, wherein a degree of interlacing within the respective interlaced frame is determined with an average difference in the pixel values within the respective interlaced frame; and
   selecting a frame packing format to be used for packing the left-eye interlaced frame and the corresponding right-eye interlaced frame into the single 3D frame based on whether the amount of interlacing within the at least one of the left-eye interlaced frame or the right-eye interlaced frame is indicated to exceed the threshold, wherein selectable frame packing formats include a side-by-side format and a top-and-bottom format;
   during encoding, combining the left-eye interlaced frame and the corresponding right-eye interlaced frame into the single 3D frame, wherein said combination of the independent interlaced frames uses the selected frame packing format;
   transmitting the single 3D frame to a destination device, the transmission including signaling embedded in a stream of video data for identifying which fields are for 3D television, the signaling communicating which frame packing formats are selected for 3D frames in the stream for decoding and display by the destination device.

2. The method of claim 1 wherein when the amount of interlacing exceeds the threshold, selecting the side-by-side format and when the amount of interlacing is below the threshold, selecting the top-and-bottom format.

3. The method of claim 1 further comprising determining the amount of interlacing by measuring inter-field motion occurring in at least one of the left-eye interlaced frame and the corresponding right-eye interlaced frame.

4. The method of claim 1 further comprising determining the amount of interlacing by measuring a difference in pixel values between pixels on adjacent lines of different fields of at least one of the left-eye interlaced frame and the corresponding right-eye interlaced frame.

5. The method of claim 1 further comprising generating a 3D video bitstream that encodes the 3D frame, the 3D bitstream including information specifying the selected frame packing format, the information being decodable by a decoder to which the 3D video bitstream is to be transmitted.

6. The method of claim 1 wherein when the amount of interlacing exceeds the threshold, selecting a frame packing format that preserves vertical resolution and when the amount of interlacing is below the threshold, selecting a frame packing format that preserves horizontal resolution.

7. The method of claim 1 wherein the 3D video is configured to be displayed in accordance with an active shutter technology or a passive polarized technology.

8. A three-dimensional ("3D") content delivery system, comprising:
- a communication interface for receiving a 3D video content stream comprising data representative of 3D video content and transmit the 3D video content stream over a network;
- a video content stream generator for generating the 3D video content, the video content stream generator being configured to:
  - analyze each pair of corresponding frames in a sequence of 3D interlaced frames to determine an amount of interlacing exhibited by each of a left-eye interlaced frame and a corresponding right-eye interlaced frame of each of the 3D interlaced frames, wherein the amount of interlacing is determined by comparing pixel values of pixels in adjacent lines, wherein a greater degree of interlacing is determined with a greater average difference in the pixel values, and providing an indication when the average difference in the pixel values exceeds a threshold;
  - select a frame packing format for each of the pairs of corresponding frames to be used for packing the pairs of corresponding frames into the 3D interlaced frames based on whether the threshold is indicated to be exceeded, wherein the frame packing formats that may be selected include both a side-by-side format and a top-and-bottom format; and
  - during encoding, format each of the pairs of corresponding frames into the 3D frame using the selected frame packing format such that the sequence of 3D interlaced frames includes at least one 3D frame having a different frame packing format from another 3D frame in the sequence;
- a video content stream communicator for transmitting the 3D video content, the video content stream communicator being configured to:
  - transmit the 3D frame to a destination device, the transmission including signaling embedded in a stream of video data for identifying which fields are for 3D television, the signaling communicating which frame packing format for the 3D frame was selected by the encoder for decoding and display by the destination device.

9. The 3D content delivery system of claim 8 wherein when the amount of interlacing exceeds the threshold, the video content stream generator is further configured to select a side-by-side format and when the amount of interlacing is below the threshold, selecting a top-and-bottom format.

10. The 3D content delivery system of claim 8 wherein the video content stream generator is further configured to determine the amount of interlacing by measuring inter-field motion occurring in at least one of the left-eye interlaced frame and the corresponding right-eye interlaced frame.

11. The 3D content delivery system of claim 8 wherein when the amount of interlacing exceeds the threshold, selecting a frame packing format that preserves vertical resolution and when the amount of interlacing is below the threshold, selecting a frame packing format that preserves horizontal resolution.

* * * * *